Dec. 31, 1968     C. L. RABINOW     3,418,909

OPTICALLY CONTROLLED PHOTOGRAPHIC SHUTTER

Filed April 25, 1966

INVENTOR
Clare Lynn Rabinow

BY *Max L. Libman*

ATTORNEY

United States Patent Office 3,418,909
Patented Dec. 31, 1968

3,418,909
OPTICALLY CONTROLLED PHOTOGRAPHIC SHUTTER
Clare Lynn Rabinow, 6920 Selkirk Drive,
Bethesda, Md. 20034
Filed Apr. 25, 1966, Ser. No. 544,765
5 Claims. (Cl. 95—53)

This invention relates to photographic shutters and particularly to the method of tripping same.

Since the beginning of the photographic art, it has been necessary to take precautions for preventing the opening and closing of the optical system from producing vibration and the resulting blur of the photograph. Many expedients have been employed in this effort. Cameras are made heavy to minimize vibration and they are often mounted on rigid supports; shutters are made balanced and provided with gently acting trips; remote control devices, such as pneumatic bulbs and flexible cables of all types are used to operate shutters, along with electrical controls operated by wire, etc. There is a trend now to small cameras, particularly to light cameras that can be easily carried about. Such cameras suffer from the fact that they do not provide enough inertia to remain stationary while the shutters are tripped. It should be noted that the size of he camera does not affect the relative amount of blur when blur is produced by angular motion.

A shock that moves a camera can arise in different ways. The motion of internal masses can move the camera body. The magnitude and direction of the shock or vibration is a function of speed, weight of the moving masses, and how poorly or well they are balanced against each other. This invention does not deal with such internally caused vibration. There are, however, motions of the camera that are produced by external effects, particularly the tripping of the shutter, that are the subject of this invention. When a finger is pressed against a shutter release, a force is applied to the camera. As the finger is pressed further and further, this force may become greater and greater in some cameras, or may remain constant in others. Finally, the shutter is tripped, and at this point, the reaction of the usual shutter suddenly collapses or, at least, changes violently. This changes the force applied by the finger to the camera and the camera is jerked. In heavy cameras equipped with "soft" release mechanisms, such shocks may be quite small. And even here, for finest work, professionals use remote controls, or they use time exposures where the camera is opened first, but the actual exposure is started and stopped by using an external black shutter such as a piece of cardboard or the like.

In small cameras, particularly those using simple self-cocking shutters it is nearly impossible to trip the shutter in a hand-held camera without shaking it. And this is particularly true of small cameras.

This invention proposes to solve the problem of motion imparted to the camera by the tripping of the shutter by the use of a non-contacting trip which is actuated by inerrupting a light falling upon a photocell. Many modern cameras are provided with batteries and photocells for the automatic control of exposure. This is normally done either by changing the speed of the shutter or by varying the F number, or both. Because of this, small batteries and small photocells have been developed which are entirely suitable for use with my invention.

Simply stated, my invention consists of a photocell mounted on a camera in a convenient location so that the light falling on this photocell can be easily interrupted by the movement of an outside object such as, for example, a finger. The photocell is connected to a transistor amplifier and the amplifier operates an electromagnetic trip for tripping the shutter.

The specific nature of my invention, as well as other objects and advantages thereof, will clearly appear from a description of a preferred embodiment as shown in the accompanying drawing, in which.

The operation of my invention is as follows:

Photocell 2, which may be of cadmium sulphide, cadmium selenide, or of any suitable type, is mounted at any convenient location near the front of the camera 3; alternatively, it may be mounted on any side of the camera. The photocell is connected to amplifier 4, which may be a conventional A.C. coupled amplifier, and which is, in turn, connected to a small electromagnet 6 operating the camera trip 7.

Figure 2:
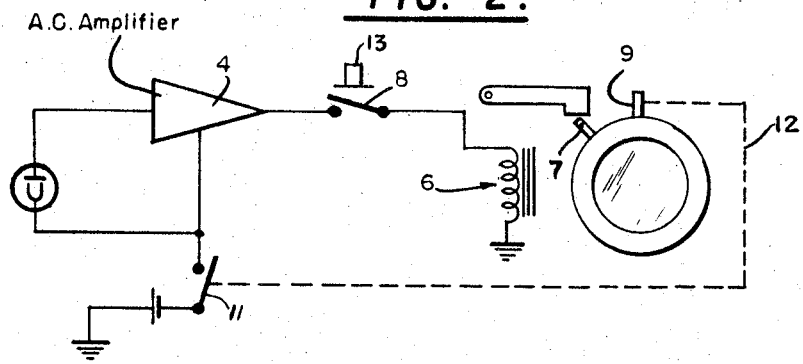
FIGURE 2 shows a possible typical circuit for this operation.

While I show a usual shutter arrangement in FIGURE 2, it should be understood that this is merely schematic. The electromagnet would normally be desinged to fit the available space in the shutter and need not be of the configuration shown. The shutter would normally be of the separate-cocking type where a separate member 9 would be used to cock the shutter. In this type of shutter, the energy needed to trip the mechanism is quite small and a small electromagnet will be adequate.

I do not show any details of the shutter because these are standard and well-known and the trip may be such as is used in the conventional cameras operated by hand. In some cameras, electromagnetic releases have been used in the past, and such releases may be used in the present invention. A camera operated by magnetic trip is shown, for example, in Patent No. 2,782,698 issued to W. G. Hill, where a magnetic trip is shown operating a camera release, but for another purpose (and operated in a different manner).

Figure 1:
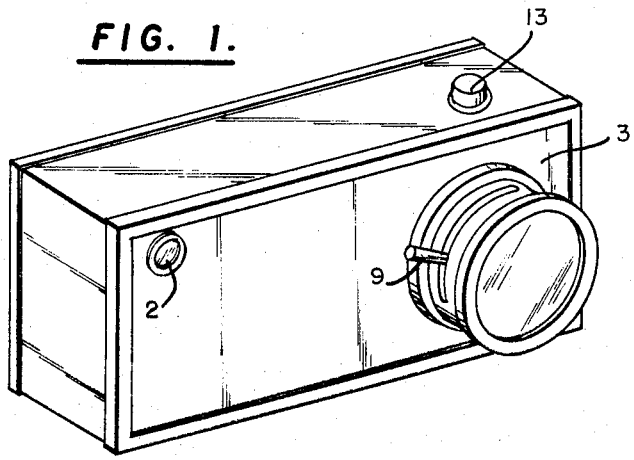
FIGURE 1 shows a general overall view of a camera provided with my invention.

In order to cock the shutter of the camera of FIGURE 1, the ordinary cocking lever 9 is moved. This action can also be made use of to close the switch 11, to turn on the power to both the amplifier and the photocell, as indicated by the dotted line 12.

Figure 3:
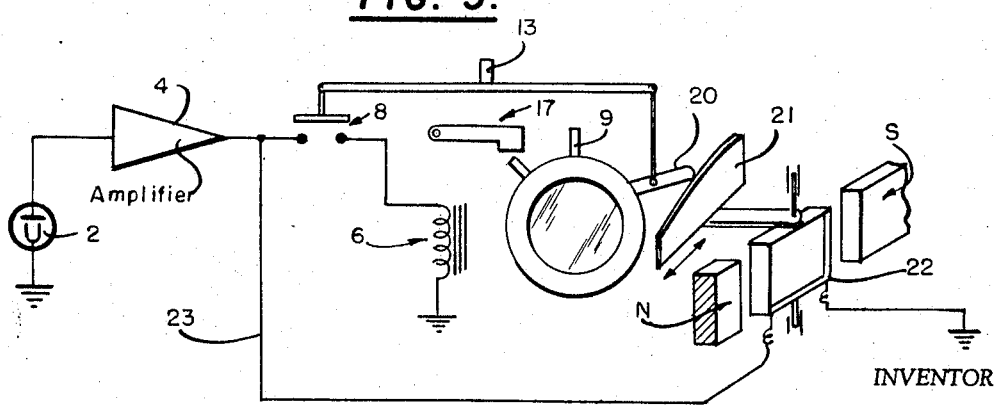
FIGURE 3 shows a circuit where the same photocell can be used for controlling the shutter opening or for tripping the shutter later.

I show an "arming" button 13 in FIGURES 1, 2, and 3 which is used to "get the shutter ready" before the photocell trip is actuated. This button operates the switch 8 in FIGURE 2. In FIGURE 3 it locks the diaphragm setting and also closes switch 8. Normally the button would be operated by one hand of the operator just before the photocell trip is actuated. If the operator changed his mind, he would merely release the "arming button" and the camera could not be tripped.

The photocell receives light from the surrounding area and when a finger is waved past it, light is first reduced and then increased. This change in light intensity produces a pulse of current which is amplified by the amplifier, resulting in the actuating of the electromagnet and releasing of the shutter. Another method of operation would be to hold one's finger over the photocell, cock the shutter, and then at the appropriate time remove one's finger so as to produce a sudden increase in light. Still another way would be to keep one's finger away from the photocell, cock the shutter and then bring the finger over the shutter so as to block the light. As an A.C. coupled amplifier is affected by the change in intensity and not by the absolute intensity, any of these expedients would produce a pulse which would operate the magnet.

The question may be raised that moving the camera in a normal fashion (such as panning) so as to select the field of interest might also trip the shutter. This would not be the case because the usual objects are too far removed from the camera and changes of light intensity even if the camera is moved in a rather rapid fashion will be much too slow to operate the shutter because the total light falling on the photocell (where the light is not focused by a lens) does not change appreciably as the camera is moved. It is obvious that if the camera were suddenly moved from a light area into a dark area behind a shadow, the output of the amplifier could produce the undesired effect, but this situation is very unlikely and the use of the "arming" button would prevent the tripping of the shutter. Also, the amplifier can be made to respond only to rapid changes of light so that the waving of a finger which changes the light in a small fraction of a second would produce the desired output pulse whereas the normal slow changes in light due to outside effects would not.

The same photocell and battery can be used to set the shutter opening and/or speed as is done in modern cameras. In this case, however, a change-over switch or other mechanism is provided that will be operated by the arming switch on top of the camera. This switch can be pressed by the left hand of the user (or the hand holding the camera) just before the camera is tripped. This switch will then transfer the operation of the photocell to the trip from its normal operation of setting the lens. Techniques for locking the diaphragm of a shutter for various light levels are well-known to the art and many cameras employ them. One example of this type of device is shown in U.S. Patent No. 3,105,427. Thus, after the photocell sets the exposure, the camera diaphragm can be locked by pressing a lever as shown in FIGURE 3. The amplifier can be left connected to the coil that sets the camera during the tripping action because the camera is locked in position by depressing the "arming" button.

Referring to FIGURE 3, the iris or diaphragm setting is controlled by lever 20, which is moved during the setting operation until it engages cam stop 21. The point at which it engages the cam stop is determined by the position of the stop at that time, which is in turn determined by the rotary position of galvanometer coil 22, and this in turn is determined by the output of a conventional exposure meter consisting of a photocell 2 and amplifier 4 in a manner well-known in this art. In the present case, the same photocell 2 is used for the shutter release as described in FIGURE 2, and also the amplified output of photocell 2 is supplied on line 23 to the coil 22 to determine the exposure setting. When the button 13 is operated to close switch 8, the lever 20 engages cam stop 21 at a setting which is determined by the light from the field of view at that time. At any time thereafter when the operator's free hand (or finger) is moved across the photocell 2, the shutter is operated as described above, without changing the diaphragm setting, which remains locked.

What I have described here is a camera trip operated without contact with the camera. This trip should produce a minimum amount of jar and is particularly suitable for modern small cameras of low weight, and small size.

It will be apparent that the embodiments shown are only exemplary and that various modifications can be made in construction and arrangement within the scope of my invention as defined in the appended claims.

I claim:

1. A hand-held portable photographic camera comprising:
    (a) a shutter for admitting light to the camera,
    (b) means to cock said shutter,
    (c) a photocell exposed to external light,
    (d) an amplifier circuit connected to said photocell for amplifying current variations due to a sudden change in either direction of available ambient light falling on said photocell, whether increasing or decreasing,
    (e) electromagnetically actuated tripping means for said shutter, connected to the output of said amplifier for tripping said cocked shutter upon a sudden change of light falling on said photocell.

2. A hand-held portable photographic camera comprising
    (a) a shutter for admitting light to the camera,
    (b) means to cock said shutter,
    (c) a photocell exposed to external light,
    (d) an amplifier circuit connected to said photocell for amplifying current variations due to sudden changes of light falling on said photocell,
    (e) electromagnetically actuated tripping means for said shutter, connected to the output of said amplifier for tripping said cocked shutter upon a sudden change of light falling on said photocell,
    (f) separate circuit means for setting the exposure or speed of said camera in accordance with light falling on said photocell, and means for selectively connecting said photocell in circuit with said last means only or with said last means and with said amplifier.

3. A hand-held portable photographic camera comprising
    (a) a shutter for admitting light to the camera,
    (b) means to cock said shutter,
    (c) a photocell exposed to external light,
    (d) an amplifier circuit connected to said photocell for amplifying current variations due to sudden changes of light falling on said photocell,
    (e) electromagnetically actuated tripping means for said shutter, connected to the output of said amplifier for tripping said cocked shutter upon a sudden change of light falling on said photocell,
    (f) separate circuit means for setting the exposure or speed of said camera in accordance with light falling on said photocell, and means for selectively connecting said photocell in circuit with said last means only or with said last means and with said amplifier,
    (g) and further means for locking the speed or exposure setting determined by the light falling on said photocell immediately prior to connecting the photocell to the amplifier.

4. The invention according to claim 3, and a manual setting means on said camera and means actuated by said manual setting means to first operate said locking means and then connect said photocell to said amplifier during one operation of the manual setting means.

5. The invention according to claim 3, said amplifier circuit including an A.C. amplifier for converting said changes of light into amplified electric signals, said A.C. amplifier being responsive to a sudden change of light intensity in either direction, whether increasing or decreasing.

References Cited

UNITED STATES PATENTS

| | | | |
|---|---|---|---|
| 1,570,004 | 1/1926 | Reed | 95—11.5 |
| 2,059,032 | 10/1936 | Riszdorfor. | |
| 2,109,361 | 2/1938 | Spiegel | 95—11 |
| 2,895,393 | 7/1959 | Goddard | 95—12.5 |

JOHN M. HORAN, *Primary Examiner.*

U.S. Cl. X.R.

95—10, 11, 11.5